United States Patent [19]
Wright

[11] Patent Number: 5,529,268
[45] Date of Patent: Jun. 25, 1996

[54] ANGLED CABLE CLAMP

[75] Inventor: John O. Wright, York, Pa.

[73] Assignee: Osram Sylvania Inc., Danvers, Mass.

[21] Appl. No.: 355,379

[22] Filed: Dec. 13, 1994

[51] Int. Cl.[6] .................................................. F16L 3/08
[52] U.S. Cl. ..................... 248/67.7; 248/74.1; 248/74.2;
                                          248/230.4; 248/316.5
[58] Field of Search .................... 248/65, 70, 74.1,
                                 248/74.2, 67.7, 316.5, 230.4

[56] References Cited

U.S. PATENT DOCUMENTS

| 1,919,353 | 7/1933 | Amor | 248/230.4 |
|---|---|---|---|
| 3,253,084 | 5/1966 | Taylor | 248/74.2 |
| 3,853,148 | 12/1974 | DeVincent et al. | 248/74.1 |
| 4,840,334 | 6/1989 | Kikuchi | 248/74.2 |
| 4,843,707 | 7/1989 | Lake, Jr. et al. | 248/74.2 |
| 5,178,479 | 1/1993 | Brown et al. | 248/74.2 |

FOREIGN PATENT DOCUMENTS

| 4-157275 | 5/1992 | Japan | 248/74.1 |
|---|---|---|---|

*Primary Examiner*—Ramon O. Ramirez
*Assistant Examiner*—Michael J. Turgeon
*Attorney, Agent, or Firm*—William H. McNeill

[57] ABSTRACT

A cable clamp is provided including first and second clamp members which are disposed at an angle relative to each other and connected together by a web. The first clamp member is configured so that a first length of a cable may be snapped therein to be held in place. A locking segment is pivotally connected to the second clamp member to lock a second length of such cable in place.

14 Claims, 3 Drawing Sheets

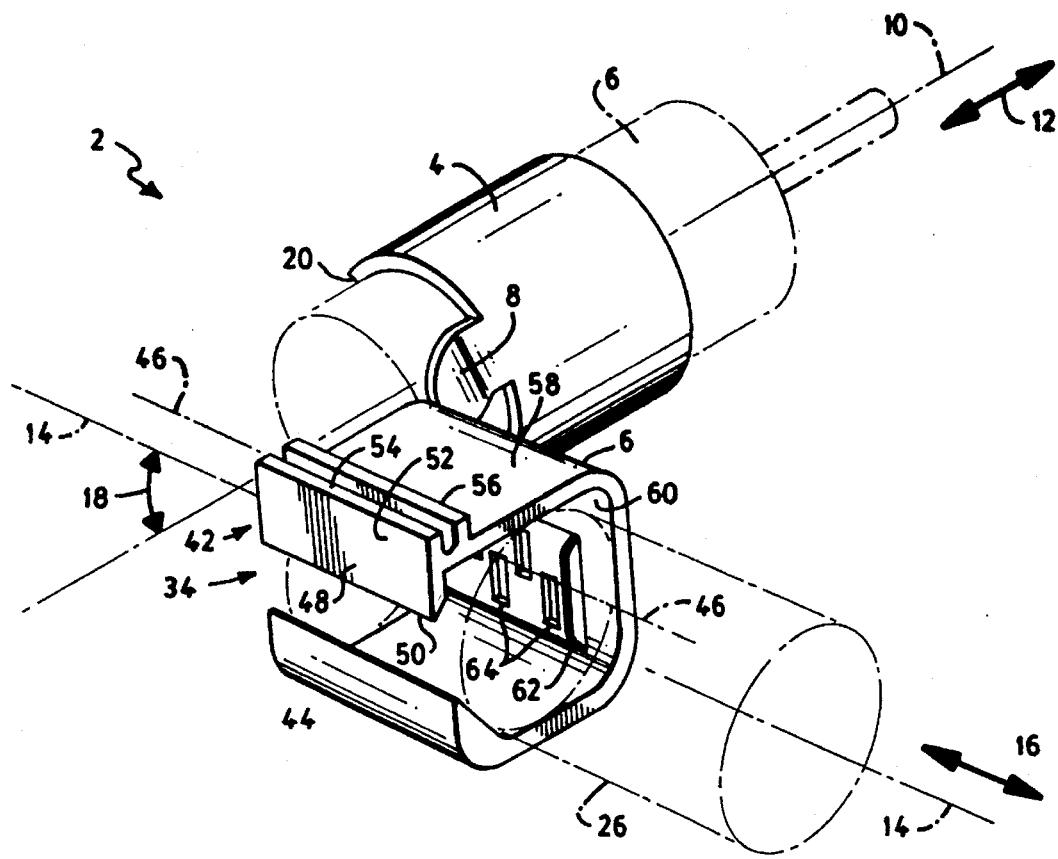
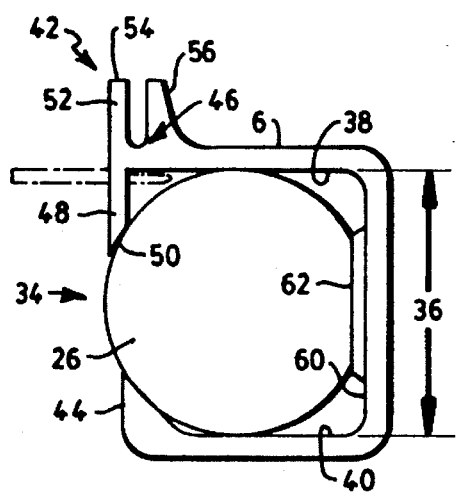
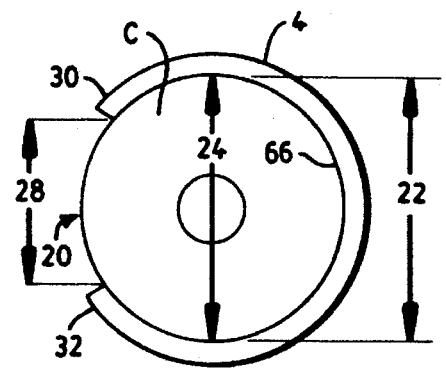
FIG. 1
FIG. 3
FIG. 2

5,529,268

ANGLED CABLE CLAMP

TECHNICAL FIELD

The present invention relates to a cable clamp which is useful in quickly connecting a cable thereto in such a manner that the cable extends in a first direction and in a second direction which is at an angle relative to the first direction.

BACKGROUND ART

The need for a cable clamp which allows a cable to extend in two directions is well known. Cable clamps known in the art for use in forming a right angle connector require the use of a dedicated right angle metal sleeve which must be assembled inside of the conventional connector shell. Since a typical application almost always requires straight connectors as well as such right angle connectors, it is necessary to have access to two types of sleeves; that is sleeves for use with such straight connectors and sleeves for use with such angled connectors.

DISCLOSURE OF THE INVENTION

It is, therefore, an object of the invention to eliminate the need for two types of sleeves in applications involving the use of straight connectors and angled connectors.

It is a further object of the invention to provide a cable clamp for angled connectors which may be used with straight connectors.

It is also an object of the invention to provide an angled cable clamp having openings by means of which a cable may be positioned around the clamp so that the cable extends in two different directions.

It is a further object of the invention to provide an angled cable clamp which retains the cable therein and resists axial movement of the cable relative to the clamp.

It is yet another object to provide an angled cable clamp which is particularly useful in locations not readily visible to the eye.

These objects are achieved, in one aspect of the invention, by providing a cable clamp comprising a first clamp member having a first axis which extends in a first direction, the first clamp member comprising a first opening which extends in the first direction for the length of the first clamp member. A second clamp member is connected to the first clamp member and includes a second axis which extends in a second direction, the second axis being oriented at an angle relative to the first axis. The second clamp member comprises a second opening which extends in the second direction for the length of the second clamp member. The second clamp member further comprises a locking segment which extends in the second direction and is pivotally connected to the second clamp member at a length of the second clamp member which extends along a third axis which is parallel to the second axis.

BRIEF DESCRIPTION OF THE DRAWINGS

FIG. 1 is a perspective view of a cable clamp embodying the present invention;

FIG. 2 is an end view of a first clamp member of the cable clamp of FIG. 1;

FIG. 3 is an end view of a second clamp member of the cable clamp of FIG. 1;

BEST MODE FOR CARRYING OUT THE INVENTION

Figure 4:
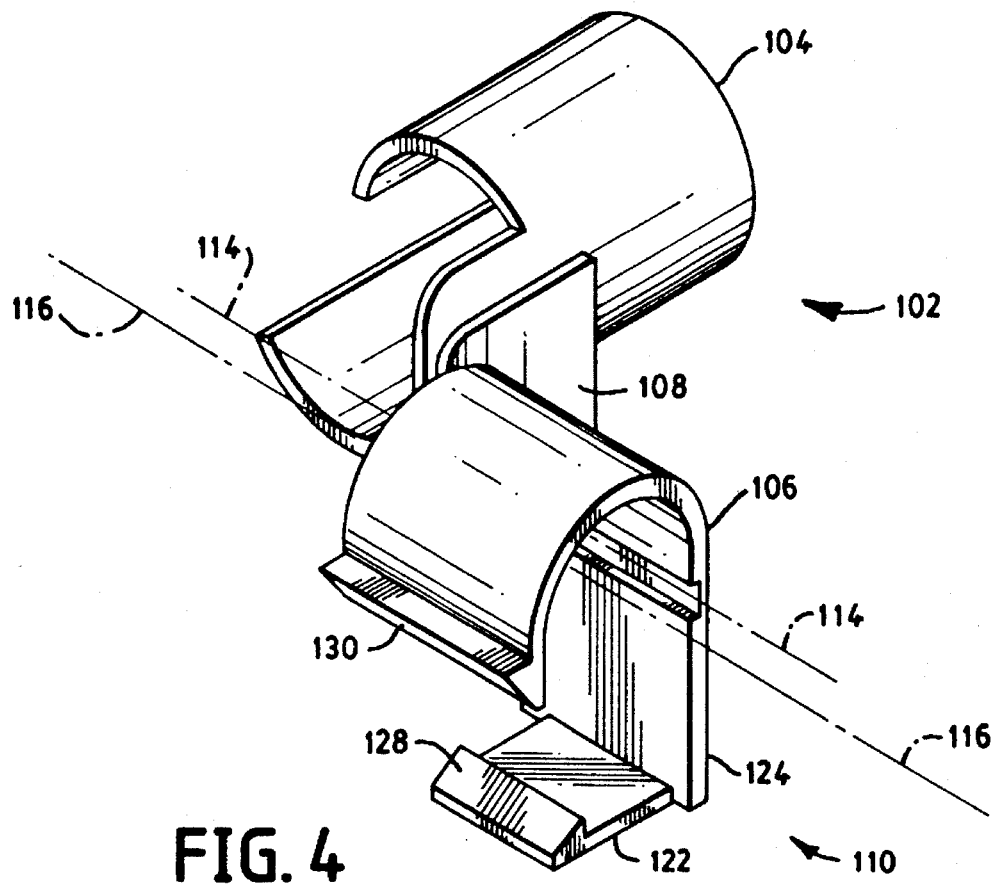
FIG. 4 is a perspective view of a cable clamp embodying another embodiment of the present invention.

For a better understanding of the present invention, together with other and further objects, advantages and capabilities thereof, reference is made to the following disclosure and appended claims taken in conjunction with the above-described drawings.

Referring now to the drawings with greater particularity, there is shown in FIGS. 1 to 3 a cable clamp 2 comprising a first clamp member 4 and a second clamp member 6 connected thereto by a web 8 which in this embodiment is depicted as being integral with clamp members 4 and 6. In the embodiment of FIG. 1, clamp members 4 and 6 and web 8 have been fabricated from a single piece of material as, for example, by conventional molding of plastic material. Alternatively, clamp members 4 and 6 may be fabricated individually and joined together by a separate web material. In the preferred embodiment, the cable clamp 2 comprises a resilient plastic material such as, for example, a polyethylene material.

The clamp member 4 has a longitudinal axis 10 which extends in the direction of arrow 12. Similarly, clamp member 6 has a longitudinal axis 14 which extends in the direction of arrow 16. Axes 10 and 14 extend at an angle 18 relative to each other. Without limitation, in the preferred embodiment angle 18 may be about 900.

The clamp member 4 includes an opening 20 which extends in direction 12 for the length of clamp member 4 from one end of such clamp member to the other. In the preferred embodiment, the clamp member 4 has a cylindrical configuration having an inner diameter 22 substantially equal to the diameter 24 of a straight connector C electrically and mechanically attached to cable 26. Connector C is depicted in the drawings as being inserted into the clamp member 4 in a manner which will be described hereinafter. In this embodiment, the width 28 of the opening 20 is less than the diameter 24 of the connector C. The connector C may be inserted into the clamp member 4 by placing a length of the connector adjacent opening 20 and squeezing the connector against such clamp member causing the ends 30, 32 of such clamp member to expand apart, due to the resiliency of the material, allowing the connector to snap into such clamp member as depicted, for example, in FIG. 2.

The clamp member 6 includes an opening 34 which extends in direction 16 for the length of clamp member 6 from one end of such clamp member to the other. In the embodiment of FIGS. 1 to 3, clamp member 6 has a square-like cross sectional configuration as depicted in FIG. 3. The distance 36 between opposing inner surfaces 38, 40 of clamp member 6 is substantially equal to the diameter of cable 26 which is depicted in the drawings as being inserted into the clamp member 6 in a manner which will be described hereinafter. As depicted in FIGS. 1 and 3, opening 34 is formed between a locking segment 42 and a portion 44 of the clamp member 6. Locking segment 42 extends in direction 16 and is pivotally connected to the second clamp member 6 at a length of the second clamp member which extends along a third axis 46 which is parallel to axis 14.

Locking segment 42 comprises a first component 48 having a first edge 50 and a second component 52 having a second edge 54 which is opposite edge 50. In the embodiment depicted in FIGS. 1 and 3, the opening 34 extends between edge 50 and portion 44 of the clamp segment 6, portion 44 being spaced from edge 50. Cable 26 may be inserted into the clamp member 6 by placing a length of the cable adjacent opening 34 when the locking segment 42 is in a first mode as depicted by solid lines in FIG. 3 and squeezing the cable against locking segment 42 and portion 44 of the clamp member 6 causing the locking member to pivot about axis 46 in a counterclockwise direction when viewing FIG. 3 to a second mode as depicted in phantom lines thereby allowing the cable to enter the clamp member 6. Any attempt to move the cable 26 in a radial direction relative to axis 14 in an attempt to remove the cable from clamp member 6 will cause the locking segment 42 to pivot in a clockwise direction viewing FIG. 3 to the position shown in solid lines, the locking segment 42 thereby locking the cable within the clamp member. In the preferred embodiment the locking of the cable 26 within the clamp member 6 as described above may be facilitated by providing a clamp member 6 which comprises a stop member 56 extending from an outer surface 58 of the clamp member. Such stop member 56 will be adjacent to and spaced from the second portion 52 when the locking segment 42 is in the position depicted in FIG. 3 in solid lines so that any effort to force the locking member 42 to pivot about axis 46 in a clockwise direction substantially beyond the position shown in solid lines will be prevented as the second portion 52 engages the stop member 56.

The distance between the portion 44 of clamp member 6 and the edge 50 of locking segment 42, will be less than the diameter of cable 26 regardless of the position of the locking segment and therefore the cable can not be readily removed from the clamp member 6 in a radial direction relative to axis 14 once the cable has been inserted into the clamp member. In order to substantially prevent movement of cable 26 relative to clamp member 6 in the direction 16 of axis 14, in the preferred embodiment clamp member 6 includes an inner surface which includes at least one cable retaining member. For example, in the embodiment of FIGS. 1 and 3, clamp member 6 includes an inner surface 60 having a cable retaining member 62 integral therewith or attached thereto which comprises a plurality of ribs 64 which extend from the inner surface 60 towards the axis 14. When the cable 26 is inserted into the clamp member 6 as depicted in FIG. 3, such ribs will depress the outer surface of the resilient cable to thereby bind it in place between such ribs and the locking segment 42. If desired, the inner surface 66 of the clamp member 4 may also include a cable retaining member (not shown). It will be apparent to those skilled in the art that the cable retaining member is not limited to the use of ribs and that, for example, any protuberance from or indentation into the inner surface of the clamp member may be used.

Figure 5:
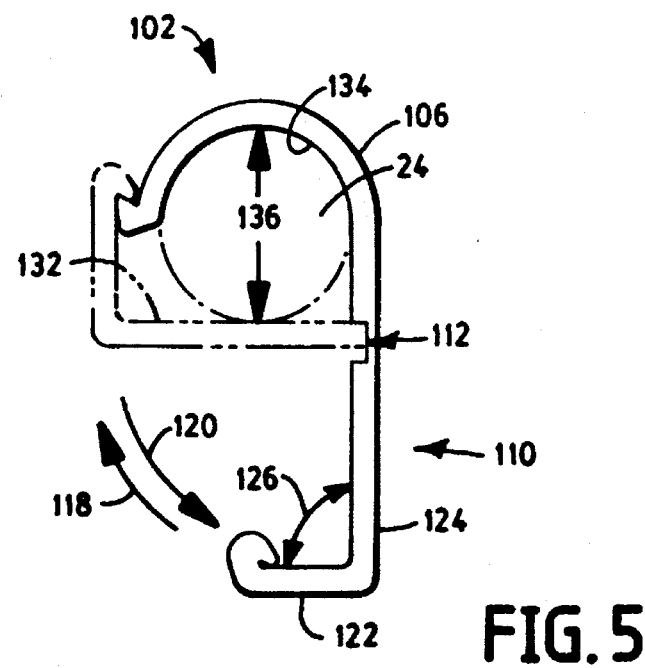
FIG. 5 is an end view of a second clamp member of the cable clamp of FIG. 4.

In an alternative embodiment,, as depicted in FIGS. 4 and 5 a cable clamp 102 is depicted which includes a first clamp member 104 which may be identical to clamp member 4 and a second clamp member 106 joined together by a web 108 which in this embodiment is depicted in the form of a separate piece of web material rather than being formed integrally with the clamp members 104 and 106. Clamp member 106 differs from clamp member 6 in that a locking segment 110 is provided which is pivotally mounted at a segment 112 which extends along an axis 114 which is parallel to an axis 116 of the clamp member 106. The locking segment 110 may be pivoted in a first direction 118 to close the locking segment 110 in a first mode as depicted in phantom lines in FIG. 5 and in a second direction 120 to open the locking segment 110 in a second mode as depicted in solid lines. In a preferred embodiment, the locking segment 110 comprises a first component 122 which extends from a second component 124 of the locking segment, the component 122 being oriented at an angle 126 relative to component 124. In the preferred embodiment, angle 126 is about 90°. In the embodiment depicted in FIGS. 4 and 5, an edge 128 of component 122 and an edge 130 of the clamp member 106, spaced from the edge 128, form respective complementary fastener members which are locked, as depicted in phantom lines in the first mode of FIG. 5 and unlocked as depicted in solid lines in the second mode.

It will be apparent to those skilled in the art that in use, a straight connector C (not shown) may be inserted into the first clamp member 104 in the same manner in which connector C was inserted into clamp member 4 of the embodiment of FIGS. 1 to 3. Cable 24, shown in phantom lines in FIG. 5, may also be inserted into the second clamp member 106 when in its open mode depicted in solid lines in FIG. 5. After insertion, the locking segment 110 may be pivoted in the direction of arrow 118 to a closed potion as depicted in phantom lines, the edges 128 and 130 snapping together to lock the locking segment in place. When in the closed mode, the size of the opening formed between an inner surface 132 of the potion 124 and an inner surface 134 of the second clamp member 106 will determine the degree to which the cable 24 may be moved in the direction of axis 116. For example, if the distance 136 across the opening is slightly less than the diameter of the cable 24, the cable will be squeezed between surfaces 132 and 134 thereby impeding axial movement of the cable.

Figure 6:
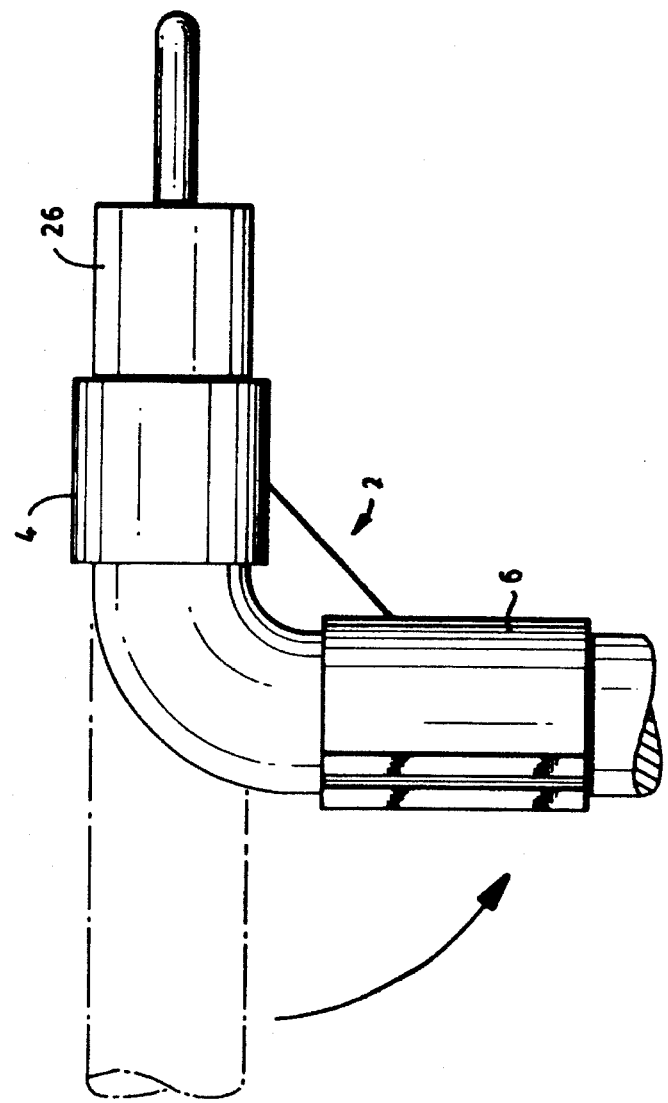
FIG. 6 is a plan view of a cable clamp of the present invention shown clamping a straight connector in a first direction and a length of cable in a second direction.
Figure 7:
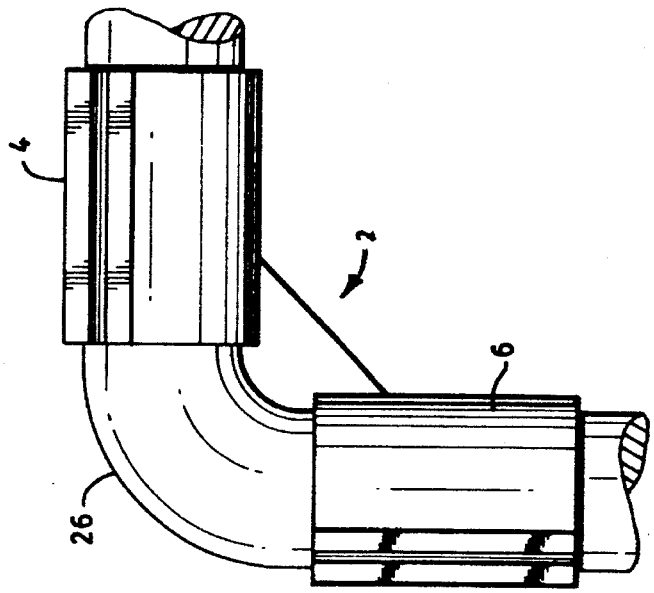
FIG. 7 is a plan view of a cable clamp of the present invention shown clamping a length of cable in two different directions.

Although the embodiments of FIGS. 1 to 5 have been described as clamping a straight connector C in one clamp member and clamping a length of cable in the other clamp member of the cable clamp of the present invention as depicted in FIG. 6, such cable clamp may also be used to effect a directional change in a cable at a length of such cable which does not include a connector, as depicted in FIG. 7. For example, in the embodiment of FIG. 7 a first segment of the cable 26 will be inserted into a clamp member 6, as described above, and a second segment of the cable will be inserted into a clamp member 4 in the same manner as the connector C was inserted into a clamp member 4, as described above.

While there have been shown an described what are at present considered the preferred embodiments of the invention, it will be apparent to those skilled in the art that various changes and modifications can be made herein without departing from the scope of the invention as defined by the appended claims.

What is claimed is:

1. A cable clamp for receiving a cable having a diameter, comprising a first clamp member having a first axis which extends in a first direction, said first clamp member comprising a first opening which extends in said first direction for the length of said first clamp member; and a second clamp member connected to said first clamp member and having a second axis which extends in a second direction, said second axis being oriented at an angle relative to said first axis, said second clamp member comprising a second opening which extends in said second direction for the length of said second clamp member, said second clamp member further comprising a locking segment which extends in said second direction and is pivotally connected to said second clamp member at a length of said second clamp member which extends along a third axis which is parallel to the second axis, said locking segment comprising a first component having a first edge, and further wherein said second opening extends between said first edge and a segment of said second clamp member which is spaced from said edge, the distance between said locking segment and said first edge being less than the diameter of a cable to be inserted into said second clamp member, said locking segment further comprising a second component having a second edge which is opposite said first edge, said locking segment being pivotal in a first direction about said third axis to a first mode and in an opposite second direction to a second mode, and further wherein said second clamp member includes an outer surface having a stop member extending therefrom, said stop member being adjacent to and spaced from said second component when said locking segment is in said first mode.

2. The cable clamp of claim 1 wherein said angle is about 90°.

3. The cable clamp of claim 1 wherein at least said first clamp member comprises a resilient material.

4. The cable clamp of claim 3 wherein at least said first clamp member has a cylindrical configuration, and further wherein said first opening has a width which is less than the diameter of a cable to be inserted into said first clamp member.

5. The cable clamp of claim 1 wherein at least said second clamp member comprises an inner surface which includes at least one cable retaining member.

6. The cable clamp of claim 1 wherein said first clamp member and said second clamp member comprise a resilient material.

7. The cable clamp of claim 1 wherein said second clamp member comprises an inner surface which includes at least one cable retaining member.

8. The cable clamp of claim 7 wherein said at least one cable retaining member comprises a plurality of ribs which extend from said inner surface.

9. The cable clamp of claim 1 wherein at least said first clamp member comprises a resilient material.

10. The cable clamp of claim 1 wherein said locking segment is pivotally mounted about said third axis for pivoting (a) in a first pivotal direction to close said second opening in a first mode and (b) in an opposite second pivotal direction to open said second opening in a second mode, said first edge and said segment being in the form of complimentary fastener members which are locked in said first mode and which are unlocked in said second mode.

11. The cable clamp of claim 10 wherein said locking segment comprises a second component which is pivotally connected to said second clamp member and which extends from said first component, said first component being oriented at an angle relative to said second component.

12. The cable clamp of claim 11 wherein at least said first clamp member comprises a resilient material.

13. The cable clamp of claim 11 wherein said second clamp member comprises an inner surface which includes at least one cable retaining member.

14. The cable clamp of claim 13 wherein said at least one cable retaining member comprises a plurality of ribs which extend from said inner surface.

* * * * *